United States Patent

Ohmura

[11] Patent Number: 5,941,013
[45] Date of Patent: Aug. 24, 1999

[54] TOP GUIDE FOR FISHING ROD

[75] Inventor: Ryuichi Ohmura, Shizuoka, Japan

[73] Assignee: Fuji Kogyo Co., Ltd., Shizuoka-ken, Japan

[21] Appl. No.: 08/747,377

[22] Filed: Nov. 12, 1996

[30] Foreign Application Priority Data

Nov. 13, 1995 [JP] Japan ..................... 7-330965

[51] Int. Cl.⁶ .................................................. A01K 87/04
[52] U.S. Cl. ............................................. 43/24; D22/143
[58] Field of Search .................... 43/24; D22/134, D22/137, 142, 143

[56] References Cited

U.S. PATENT DOCUMENTS

| D. 270,268 | 8/1983 | Ohmura | D22/143 |
| D. 340,499 | 10/1993 | Ohmura | D22/143 |
| 4,586,285 | 5/1986 | Kim | 43/24 |

FOREIGN PATENT DOCUMENTS 2082032  3/1982  United Kingdom ............ 43/24

OTHER PUBLICATIONS

Fujitackles, Fuji Kogyo Co., Ltd., p. 17 (1989).

Primary Examiner—Jack W. Lavinder
Attorney, Agent, or Firm—Evenson, McKeown, Edwards & Lenahan, PLLC

[57] ABSTRACT

In order to avoid entanglement of a fishing line, a shape of a bridge is contrived. A top guide includes a guide ring retainer portion having a ring shape, a bridge extending downwardly rearwardly from both right and left sides, and a cylindrical mounting pipe into which a fishing rod is to be inserted. An outer configuration of the bridge is formed substantially into a V-shape with rear end portions being closed as viewed from above and below, the rear end portions being formed into an arrow head having a certain length in longitudinal direction, a lower surface of the rear end portions being formed into a slant surface close to the mounting pipe in accordance with the rear side, and the rear end portions being fixed to an outer circumferential surface of the mounting pipe from below, and, there being not bent portion like stepped portions in the outer shape of the bridge per se. Bent-portion-like stepped portions are not formed either in portions where the bridge and the mounting pipe are continuous with each other, for example, a position where the outer edge of each side and the outer circumferential surface of the mounting pipe are connected with each other, and there is a very little likelihood the fishing line to be hooked at the side portion and the pipe receiver portion.

2 Claims, 4 Drawing Sheets

TOP GUIDE FOR FISHING ROD

BACKGROUND OF THE INVENTION

The present invention relates to a top guide for a fishing rod. More particularly, the invention relates to a top guide for a fishing rod, provided with a guide ring retainer portion for retaining a guide ring, a cylindrical mounting pipe into which a tip end portion of the fishing rod is to be inserted, a bridge which extends downwardly and backwardly from right and left sides of the guide ring retainer portion, in which a rear end portion of the bridge is fixed to an outer circumferential surface of the mounting pipe from below. The invention relates to an improvement in a top guide for a fishing rod in which a shape of the bridge is contrived to reduce a possibility of hooking of lines.

A conventional top guide mounted on a tip end portion of a fishing rod, in particular, a top guide mounted on a so-called external line-pass type fishing rod, in general, is composed of a guide ring retainer, a mounting pipe and a connecting means for connecting these components. The tip end portion of the fishing rod is inserted into the mounting pipe.

In addition, a middle or larger size top guide is often provided with the plurality of the above-described connecting means.

FIGS. 6 and 7 show an example a of such a type of conventional fishing rod top guide.

In FIGS. 6 and 7, reference character b denotes a frame made of metal which is composed of a guide ring retainer c in the form of a ring, a bridge d extending downwardly and backwardly from both right and left sides of the guide ring retainer, and a leg piece e having a relatively short length and extending substantially downwardly and backwardly from the lower end portion of the guide ring retainer c. The bridge d is substantially in the form of a trapezoid having a short width on the right and left as viewed from above and having a shape of J-letter turned down 90 degree as viewed from the side. The rear end portion f is bent downwardly in a semicircular shape. Reference character g denotes a mounting pipe made of metal. A rear portion of the leg piece e is inserted into the front end portion of the mounting pipe. The middle portion of the mounting pipe g is laid on the rear end portion f of the bridge d. The outer circumferential surface of the mounting pipe a and the rear end portion f of the bridge d are connected together by welding or brazing. The leg piece e and the front end face of the mounting pipe g are connected together by welding or brazing. Then, the frame b and the mounting pipe g are connected into one piece.

A guide ring h is fitted inside of the guide ring retainer portion c.

A tip end portion of the fishing rod i is inserted into the mounting pipe g from the back side. Thus, the top guide a is mounted on the fishing rod i. The fishing line j is inserted into the guide ring h.

The guide for the fishing rod should meet the requirement that the entanglement of fishing line be avoided as much as possible.

In this respect, the above-described top guide a suffers from various problems. Namely, clearly-stepped portions k, k and k are formed at position where the rear end portion f of the bridge d and the outer circumferential surface of the mounting pipe g are continuous with each other. There would be a fear that the fishing line j would be hooked at the position of the stepped portions k, k and k. Thus, it would be impossible to release and retrieve the fishing line j.

Also, the shape of the bridge d is in a shape of J-letter turned down 90 degree as viewed from the side. A large part of the bridge d projects above a line connecting both ends. For this reason, when the fishing line j is tensioned under the condition that the fishing line has passed through the inside of the bridged as shown by two-dot-and-dash line in FIG. 7, the fishing line a is often unable to escape out of the bridge d. This causes the entanglement of the fishing line.

SUMMARY OF THE INVENTION

According to a first aspect of the present invention, in order to solve the above-noted defects, there is provided a top guide for a fishing rod, in which an outer configuration of said bridge is formed substantially into a V-shape with rear end portions being closed as viewed from above and below, the rear end portions are formed into an arrow head having a certain length in longitudinal direction, and a lower surface of the rear end portion is formed into a slant surface close to said mounting pipe in accordance with the rear side.

According to a second aspect of the present invention, upper edges of the bridge as a whole are located below a straight line connecting both ends thereof.

Accordingly, in the top guide for the fishing rod according to the first aspect of the present invention, there are not bent-portion-like stepped portions in the outer shape of the bridge per se. In addition, since bent-portion-like stepped portions are not formed either in portions where the bridge and the mounting pipe are continuous with each other, for example, a portion where an outer side edge of each side bridge and the outer circumferential surface of the mounting pipe are connected with each other as viewed from above, and also in a portion where the lower surface of the rear end portion of the bridge and the above-described outer circumferential surface are connected with each other, there is a very little likelihood that the fishing line would be hooked at the side portion and the rear end portion.

Since the rear end portion of the bridge is formed in the arrow head, it is possible to form it neatly with ease and with small pressure, also in the case of the press, for example. It is therefore possible to reduce the manufacturing cost.

Also, according to the second aspect of the present invention, even if the fishing line is caused to pass through the inside of the bridge, the fishing line is tensioned so that it may escape from the inside space of the bridge. It is therefore possible to automatically eliminate or prevent the fishing line entanglement owing to the bridge.

DESCRIPTION OF THE PREFERRED EMBODIMENTS

Figure 1:
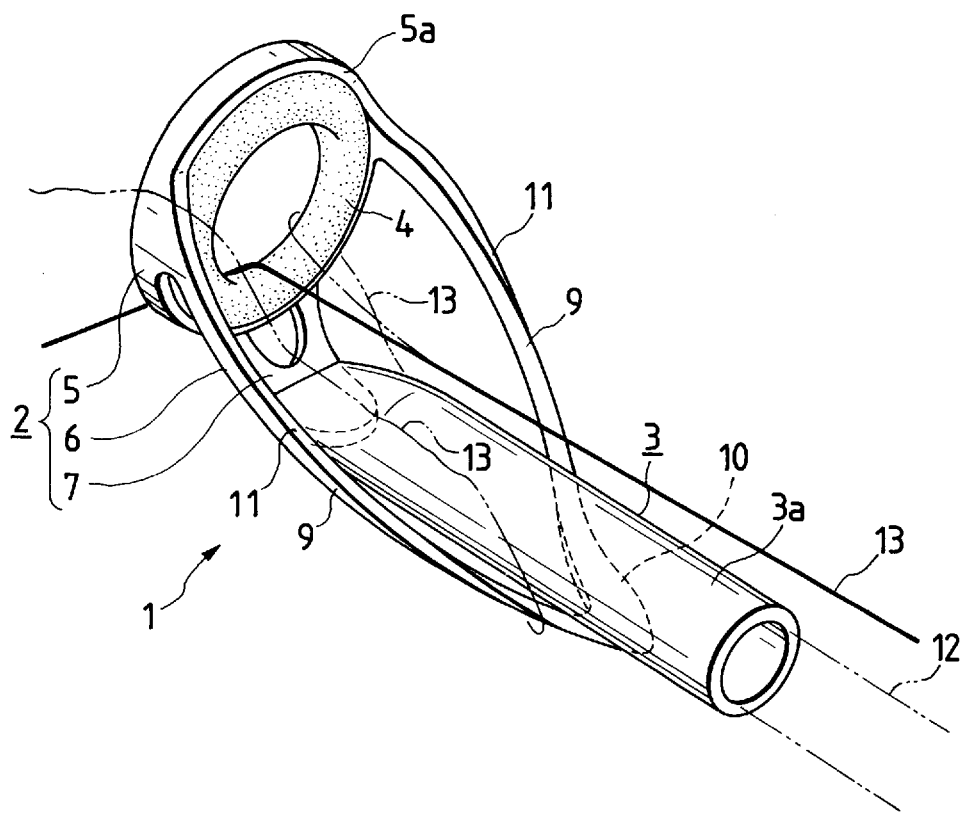
FIG. 1 is a perspective view showing a top guide according to an embodiment of the invention.
Figure 2:
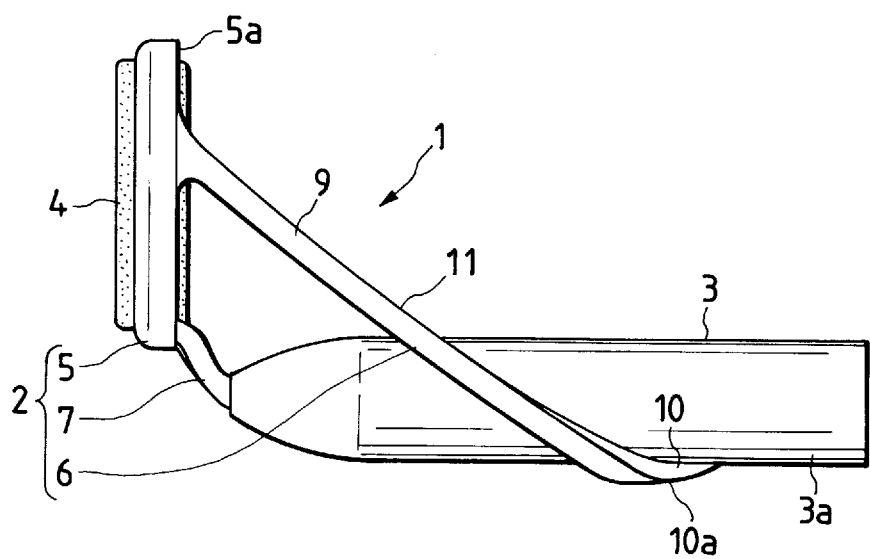
FIG. 2 is a side elevational view showing the top guide shown in FIG. 1.
Figure 3:
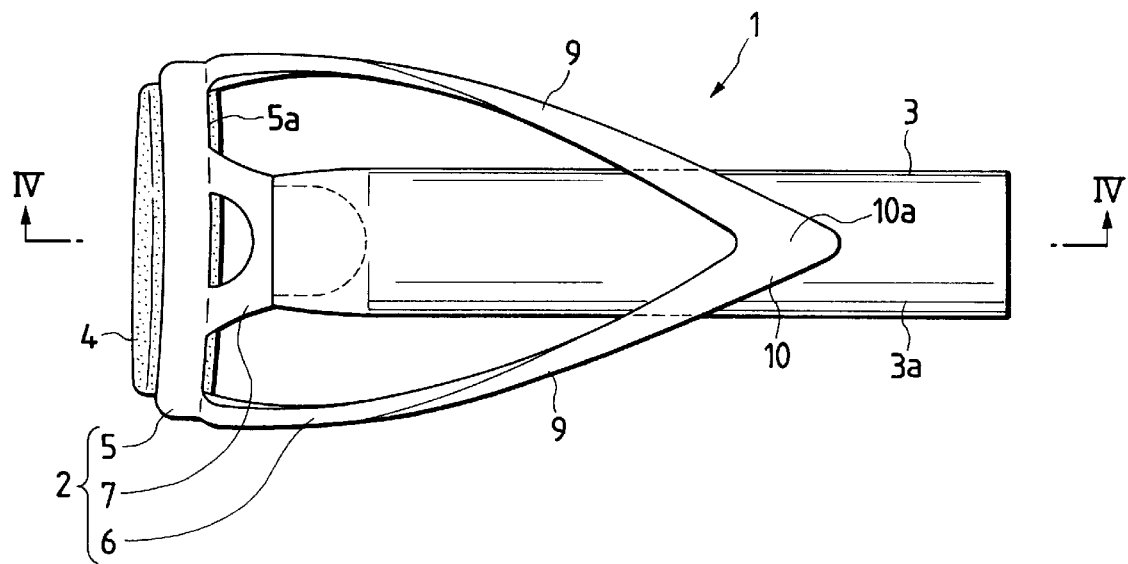
FIG. 3 is a bottom view showing the top guide shown in FIG. 1.

The present invention will now be described in accordance with the embodiment of a top guide for a fishing rod with reference to the accompanying drawings.

Incidentally, in this embodiment, the present invention is applied to a top guide to be mounted on a type of the fishing rod in which a path of the fishing line fed out from a reel is located above the fishing rod.

In the drawings, reference numeral 1 denotes a top guide for a fishing rod which is composed of a metal made frame 2 and a metal made mounting pipe 3.

The frame 2 is composed of a guide ring retainer portion 5 for retaining a guide ring 4, a bridge 6 and a leg piece 7. The bridge 6 and the leg piece 7 are used for connection with the mounting pipe 3.

Figure 4:
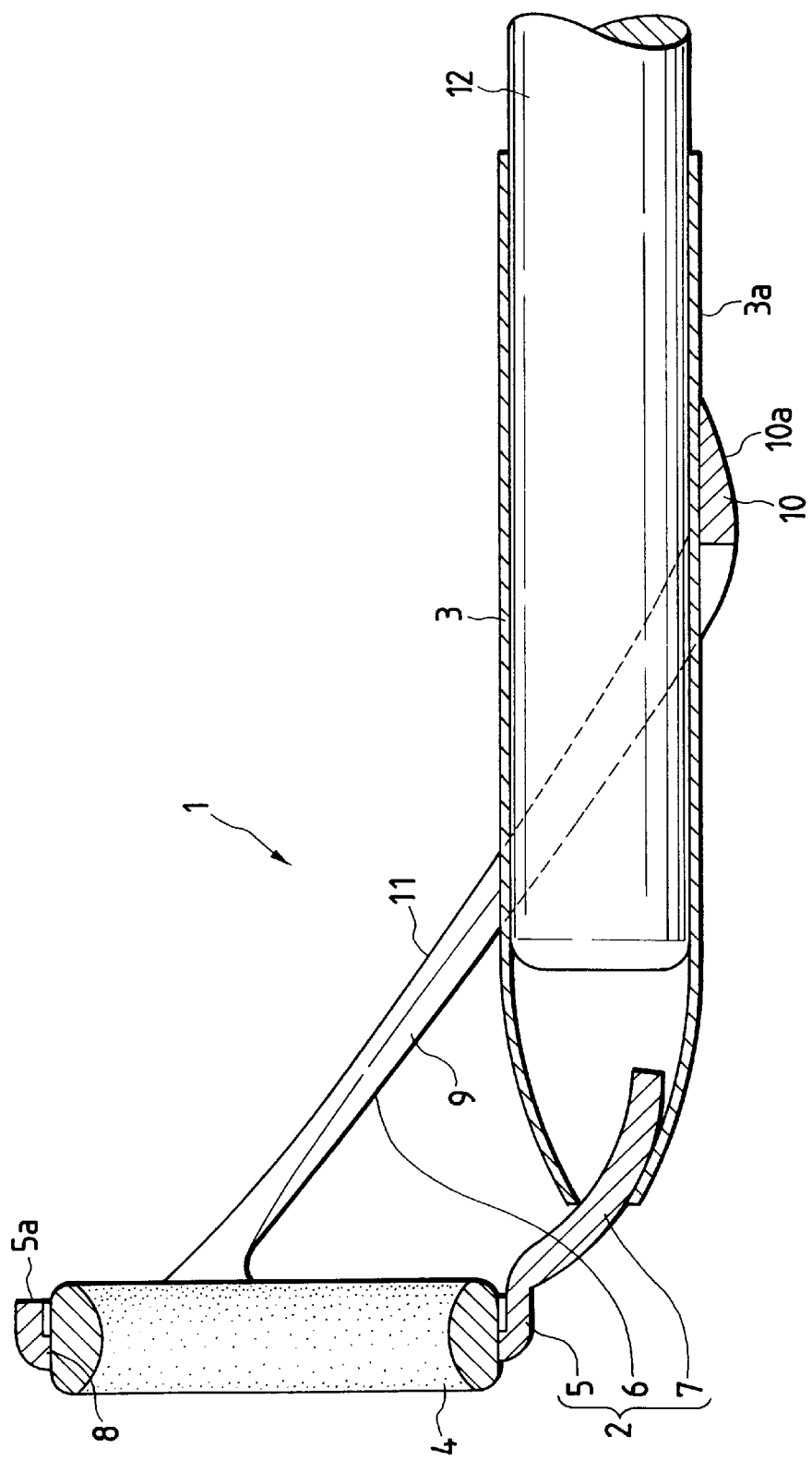
FIG. 4 is an enlarged cross-sectional view taken along the line IV—IV of FIG. 3.
Figure 6:
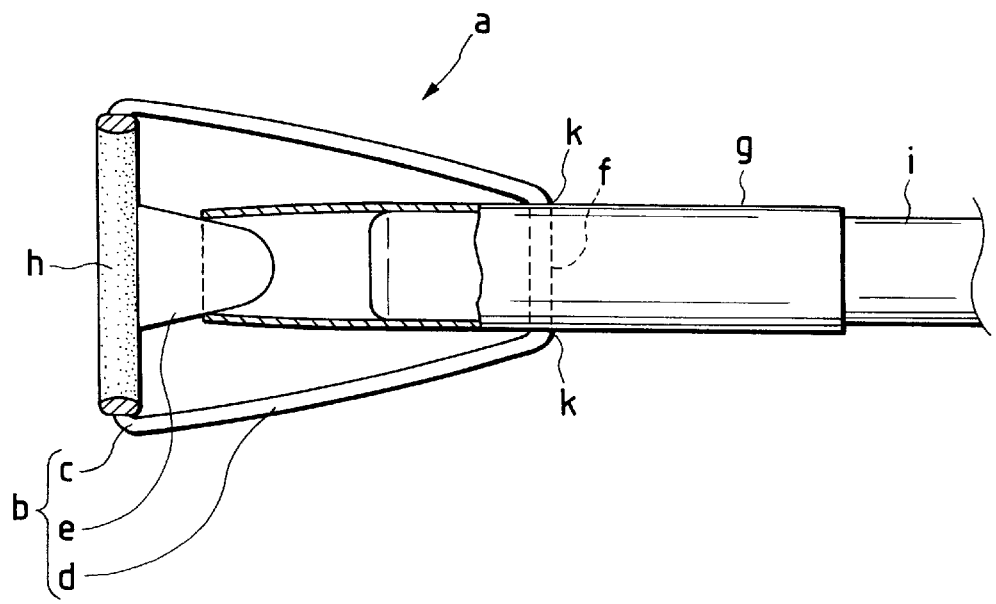
FIG. 6 is a plan view showing an example of a conventional top guide for a fishing line, from which a part has been removed.
Figure 7:
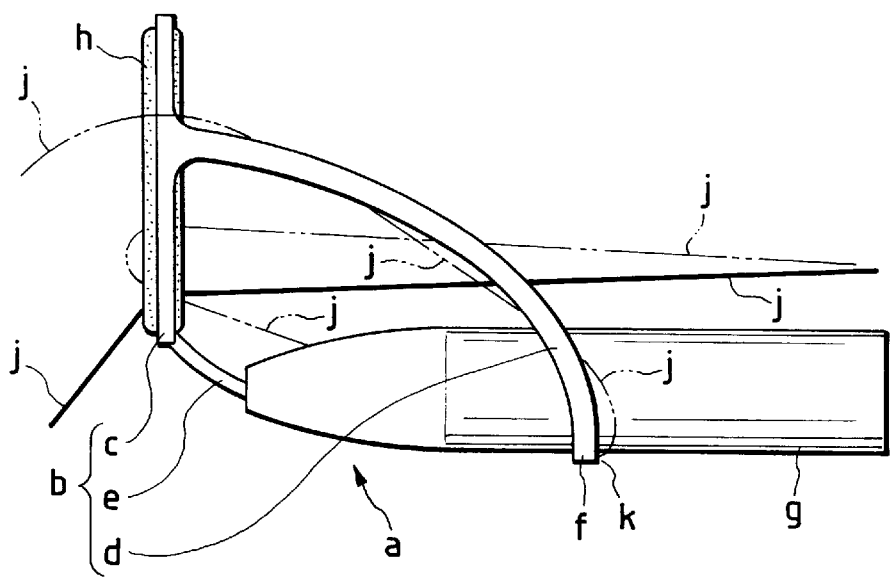
FIG. 7 is a side elevational view showing the top guide shown in FIG. 6.

The guide ring retainer portion 5 is in the form of a ring. An annular holding edge 8 (see FIG. 4) which projects somewhat to the inside is formed in a front end (A front side means the left upward direction in FIG. 1).

The bridge 6 is substantially in the form of a V-shape as viewed from above. Namely, numeral 9, denote a pair of right and left side pieces constituting the bridge 6. The side pieces 9 and 9 are formed like plates having a relatively narrow width. The side pieces extend rearwardly from both right and left sides of the rear edge 5a of the guide ring retainer portion 5, and are continuous at the rear end portion 10 (hereinafter referred to as a pipe receiver) with a distance between the side pieces being gradually decreased rearwardly. Furthermore, the side pieces are twisted about 90° in opposite direction to each other from the front end to the pipe receiver 10, and their width is increased from the vicinity of the pipe receiver 10.

The above-described pipe receiver 10 is formed into a substantially arrow head having a certain length in longitudinal direction and a taper rearwardly as viewed from above. A lower surface 10a thereof is formed into a slant surface to be raised backwardly.

Also, upper edges 11 and 11 of the bridge 6 are arranged to be located below a straight line connecting its ends as a whole, and are extremely gently bent downwardly as a whole in this embodiment.

Incidentally, the "upper edges 11 and 11" referred to herein means surfaces or edges facing upwardly.

The leg piece 7 projects downwardly and backwardly from a lower end portion of a rear edge 5a of the guide ring retainer portion 5.

Such a frame 2 is formed by forming a single stainless plate by pressing it by a drawing work and a punching work.

The mounting pipe 3 is formed basically into a cylinder and is worked so that the outer circumferential surface 3a of its front end portion extend laterally.

Then, a substantially middle portion of the mounting pipe 3 is laid on the pipe receiver portion 10 of the bridge 6. The rear portion of the leg piece 7 is inserted into a front end portion of a hole of the mounting pipe 3. Under this condition, a brazing or welding is effected among the mounting pipe 3 and the pipe receiver portion 10 and the leg piece 7, thus, the frame 2 and the mounting pipe 3 are coupled with each other in a one-piece manner.

Such a fishing rod top guide 1 is mounted on the fishing rod 12 by inserting the front end portion of the fishing rod 12 into the mounting pipe 3 from the rear side. Then, the fishing line 13 is caused to pass through the guide ring 4.

In such a fishing rod top guide 1, there is a small fear of the fishing line entanglement. More specifically, since the bridge 6 is formed into the shape as described above, there are no bent-portion-like stepped portions in itself. In addition, since no bent-portion-like stepped portions are formed also in portions where the bridge 6 and the mounting pipe 3 are continuous with each other, for example, a portion where an outer side edge of each side piece 9, 9 and the outer circumferential surface 3a of the mounting pipe 3 are connected with each other as viewed from above, and also in a portion where the lower surface 10a of the pipe receiver portion 10 and the above-described outer circumferential surface 3a are connected with each other, there is a very little likelihood that the fishing line 13 would be hooked at the side portions 9 and 9 and the pipe receiver portion 10.

Then, as described above, since the pipe receiver portion 10 of the bridge 6 is formed into the arrow head having a certain length in longitudinal direction, it is possible to readily perform the working for forming the lower surface 10a into a slant surface. In other words, since the portion that will become the pipe receiver portion 10 has a smaller width in accordance with the rear end under the condition that the frame 2 is punched out of the plate member, for example, it is sufficient to apply a small pressure to press this portion by pressing. Accordingly, it is possible to save the manufacturing cost.

Furthermore, since the upper edges 11 and 11 of the bridge 6 are bent downwardly as a whole, even if the fishing line 13 is entangled as shown by two-dot-and-dash line and part thereof is caused to enter inside of the bridge 6 as shown in FIG. 1, when the fishing line 13 is tensioned under this condition, the part which has entered the bridge 6 may be escaped outside the bridge automatically in general. Thus, the fishing line entanglement may be prevented or automatically eliminated.

Figure 5:
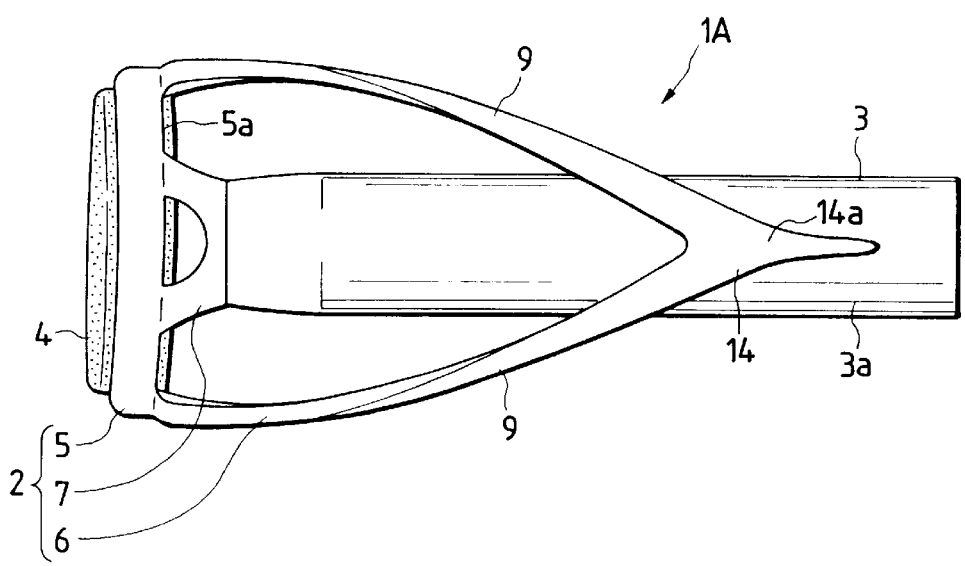
FIG. 5 is a bottom view showing a rear end portion of the bridge according to a modification to the invention.

FIG. 5 shows a modification 14 of a rear end portion of the bridge 6. The rear end portion 10 is elongated in length in comparison with that described above. Corresponding to the elongated length, it is possible to make the slant of the bottom surface 14a more gently so that it is possible to further enhance the prevention effect on the fishing line entanglement.

As has been apparent from the foregoing description, in a fishing rod top guide according to a first aspect of the invention, there is provided a top guide for a fishing rod, comprising a guide ring retainer portion for retaining a guide ring, a cylindrical mounting pipe into which a tip end portion of the fishing rod is to be inserted, and a bridge which extends from both right and left side portions of the guide ring retainer portion rearwardly, wherein a rear end portion of the bridge is fixed to an outer circumferential surface of the mounting pipe from below, characterized in that an outer configuration of the bridge is formed substantially into a V-shape with rear end portions being closed as viewed from above and below, the rear end portions are formed into an arrow head having a certain length in longitudinal direction, and a lower surface of the rear end portion is formed into a slant surface close to the mounting pipe in accordance with the rear side.

Accordingly, in the top guide for the fishing rod according to the present invention, there are not bent-portion-like stepped portions in the outer shape of the bridge per se. In addition, since bent-portion-like stepped portions are not formed either in portions where the bridge and the mounting pipe are continuous with each other, for example, a portion where an outer side edge of each side bridge and the outer circumferential surface of the mounting pipe are connected with each other as viewed from above, and also in a portion where the lower surface of the rear end portion of the bridge and the above-described outer circumferential surface are connected with each other, there is a very little likelihood that the fishing line would be hooked at the side portion and the pipe receiver portion.

Then, since the rear end portion of the bridge is formed in the arrow head, it is possible to form it neatly with ease and with small pressure, also in the case of the press, for example. It is therefore possible to reduce the manufacturing cost.

Also, in a top guide for a fishing rod, according to a second aspect of the invention, it is characterized in that the upper edges of the bridge as a whole are located below the straight line connecting both ends of the bridge.

Accordingly, in the fishing rod top guide according to the present invention, even if the fishing line is caused to pass through the inside of the bridge, the fishing line is tensioned so that it escape from the inside space of the bridge. It is therefore possible to automatically eliminate or prevent the fishing line entanglement owing to the bridge.

Incidentally, in the foregoing embodiment, in order that the upper edges of the bridge as a whole are located below the line connecting both the ends with each other, the upper edges are bent gently downwardly. Such a structure may be modified and would not be limited to that shown in the embodiment.

Also, it is not necessary to form the bridge integral with the guide ring retainer portion according to the invention.

Then, in the foregoing embodiment, the present invention is applied to the case where the guide path for the fishing rod taken out of the reel is located above the fishing rod. However, the present invention is not limited to a type of a fishing rod top guide described above. It is possible to apply the invention to a type of a fishing rod in which the fishing line path is located below the fishing rod. In this case, the up-and-down concept described above may be reversed. In this case, it is apparent that the concept of the invention may be equally applied.

What we claim is:

1. A top guide for a fishing rod, comprising a guide ring retainer portion for retaining a guide ring, a cylindrical mounting pipe into which a tip end portion of the fishing rod is to be inserted, and a bridge which extends from both right and left side portions of said guide ring retainer portion rearwardly, wherein a rear end portion of said bridge is fixed to a downwardly facing outer circumferential surface of the mounting pipe, characterized in that an outer configuration of the bridge is formed substantially into a V-shape as viewed from above and below, the rear end portion being formed into an arrow head having a certain length in longitudinal direction, and a lower surface of the rear end portion being formed into a slant surface portion having a rearwardmost edge which abuts the downwardly facing outer circumferential surface of the mounting pipe, wherein upper edges of the bridge are located below a straight line drawn between the top of a front end of the bridge where the bridge is connected to the guide ring retainer portion and said rearwardmost edge of said slant surface.

2. A top guide for a fishing rod, comprising:
   a guide ring retainer portion;
   a cylindrical mounting pipe;
   a bridge including a left side piece and a right side piece, each of said side pieces extending rearwardly, downwardly and inwardly from said guide ring retainer portion to meet with each other at a rear end portion of the bridge, such that said side pieces form a substantially V-shape when viewed from above, an upper surface of said rear end portion being fixed to a downwardly facing outer circumferential surface of the mounting pipe, and a lower surface of the rear end portion extending upwardly to form a slant surface portion having a rearwardmost edge which abuts said outer circumferential surface of the mounting pipe to define a step-free surface transition therebetween; and
   wherein upper edges of the bridge are located below a straight line drawn between the top of a front end of the bridge where the bridge is connected to the guide ring retainer portion and said rearwardmost edge of said slant surface.

* * * * *